(12) United States Patent
Andre et al.

(10) Patent No.: US 9,572,438 B2
(45) Date of Patent: Feb. 21, 2017

(54) TERMINAL CASE

(71) Applicant: Ingenico Group, Paris (FR)

(72) Inventors: Jerome Andre, Montoison (FR); Cyril Janot, Grane (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/648,856

(22) PCT Filed: Nov. 28, 2013

(86) PCT No.: PCT/EP2013/075021
§ 371 (c)(1),
(2) Date: Jun. 1, 2015

(87) PCT Pub. No.: WO2014/083136
PCT Pub. Date: Jun. 5, 2014

(65) Prior Publication Data
US 2015/0327694 A1    Nov. 19, 2015

(30) Foreign Application Priority Data

Nov. 30, 2012 (FR) ...................... 12 61506

(51) Int. Cl.
| G07F 7/00 | (2006.01) |
| A47F 9/02 | (2006.01) |
| A47F 10/00 | (2006.01) |
| A47F 10/02 | (2006.01) |

(Continued)

(52) U.S. Cl.
CPC ................. *A47F 9/02* (2013.01); *A47F 10/00* (2013.01); *A47F 10/02* (2013.01); *G07F 7/0873* (2013.01); *G07F 7/0886* (2013.01); *H04M 1/0216* (2013.01); *H04M 1/0249* (2013.01); *H04M 1/0252* (2013.01)

(58) Field of Classification Search
CPC ............ A47F 9/02; A47F 10/00; A47F 10/02; G07F 7/0873; G07F 7/0886; H04M 1/0216; H04M 1/0249; H04M 1/0252
USPC ...... 312/326; 361/679.02, 679.55, 752, 755; 235/375, 379; 347/218, 222; 16/231, 232
See application file for complete search history.

(56) References Cited

U.S. PATENT DOCUMENTS 4,802,605 A * 2/1989 Salmon ................ G06F 1/1681
16/267
6,850,767 B1   2/2005 Maxymych
(Continued)

FOREIGN PATENT DOCUMENTS

| DE | 202006019287 U1 | 6/2007 |
| EP | 1559563 A1 | 8/2005 |

OTHER PUBLICATIONS

International Search Report dated Dec. 19, 2013 for corresponding International Patent Application No. PCT/EP2013/075021, filed Nov. 28, 2013.

(Continued)

*Primary Examiner* — James O Hansen
(74) *Attorney, Agent, or Firm* — David D. Brush; Westman, Champlin & Koehler, P.A.

(57) ABSTRACT

A housing of a terminal is formed by at least one lower cover and an upper cover. The housing the lower cover and upper cover are fixed together in an articulated manner, the articulated fixing being able to take up at least one position closing the housing and a position opening the housing, in which the lower cover and upper cover are joined together.

6 Claims, 5 Drawing Sheets

(51) Int. Cl.
*H04M 1/02* (2006.01)
*G07F 7/08* (2006.01)

(56) References Cited

U.S. PATENT DOCUMENTS

| | | | |
|---|---|---|---|
| 7,724,534 B2* | 5/2010 | Wang | H04M 1/0216 |
| | | | 16/223 |
| 2004/0061683 A1* | 4/2004 | Mochizuki | G06F 1/1601 |
| | | | 345/168 |
| 2004/0096256 A1* | 5/2004 | Hayashi | B26D 1/385 |
| | | | 400/621 |
| 2005/0141179 A1 | 6/2005 | Riddiford | |
| 2007/0077826 A1 | 4/2007 | Cheng | |
| 2008/0061058 A1 | 3/2008 | Wang et al. | |
| 2009/0140042 A1* | 6/2009 | Clegg | A45C 11/182 |
| | | | 235/380 |
| 2010/0011536 A1 | 1/2010 | Lin | |
| 2012/0155946 A1* | 6/2012 | Colonel | B41J 11/0025 |
| | | | 400/691 |
| 2013/0259557 A1* | 10/2013 | Nakajima | B41J 15/04 |
| | | | 400/613.1 |

OTHER PUBLICATIONS

French Search Report dated Aug. 14, 2013 for corresponding French Patent Application No. FR1261506, filed Nov. 30, 2012.
English translation of the Written Opinion dated May 31, 2015 for corresponding International Patent Application No. PCT/EP2013/075021, filed Nov. 28, 2013.

* cited by examiner

TERMINAL CASE

1. CROSS-REFERENCE TO RELATED APPLICATIONS

This Application is a Section 371 National Stage Application of International Application No. PCT/EP2013/075021, filed Nov. 28, 2013, the content of which is incorporated herein by reference in its entirety, and published as WO 2014/083136 on Jun. 5, 2014, not in English.

2. FIELD OF THE INVENTION

The field of the invention is that of terminal cases, and more particularly cases for electronic payment terminals.

3. PRIOR ART

Present-day cases for electronic payment terminals generally have two parts, namely a lower cover and an upper cover, used to house all the components and operating elements of the terminal (electronic circuitry, paper roll for printing, etc) and which are fixed to each other by a plurality of screws.

The case of a terminal has the function especially of protecting the interior of the terminal when it is in use and especially when the terminal has a fall. Thus, one of the design constraints of such a case, once the constraints related to the layout of the components to be housed in a restricted space are resolved, lies in its resist. In addition, such cases must adapt to the reduction of terminals sizes requested by users. This reduction dictates especially constraints on the screw fastenings which can increase the thickness of the terminal.

At present, fall resistance is chiefly provided by an increase in the number of screws that fasten the covers to each other.

The main drawback of the addition of screws lies in the lack of space for these screws, because of the reduction of the size of the terminals, chiefly at the position of the roll of paper, which is located at one end of the terminal, and therefore at a junction between the lower and upper covers.

Besides, the case needs to be provided with an opening, for example for maintenance work on the components inside the terminal. Another drawback with present-day cases and the great increase in the number of fastening screws is that the dismantling of the terminal is made lengthier.

Finally, because of the fragility of the screw-fastening sleeves, the increase in the number of screws does not always make it possible to keep the case closed during or after a fall.

4. SUMMARY OF THE INVENTION

The invention does not have the drawbacks of the prior art.

The invention relates to a case of a terminal formed by at least one lower cover and one upper cover.

According to one particular embodiment, the case has means of hinged fastening of lower and upper covers to each other, the means of hinged fastening being adapted to taking at least one position of closure of the case and one position of opening of the case, in which the lower and upper covers are fixedly attached.

Thus, the invention relies on a novel and inventive approach to the implementation of a communications terminal case and more particularly an electronic payment terminal case enabling the lower and upper parts of the case to be fixed to each other in a hinged manner, i.e. being mobile relative to each other and fixedly attached even when the case is in the open position.

Thus, the invention in its different particular embodiments, optimizes the closing of a terminal case by using a hinged fastening means enabling both parts of the case to remain fixedly joined when passing from a closed position to an open position, thus making it easy to handle the case during maintenance work for example.

In addition, these hinged fastening means do away with the need to use additional screws, which would increase the size of the terminal. At the same time, these means ensure efficient closure of the case if the terminal has a fall. Indeed, these hinged fastening means have a certain flexibility that prevents breakage and therefore enables the case to remain closed when it falls, unlike screw-fastening means which deteriorate in a fall either because the screws get broken or because the parts of the covers around the screws get broken or cracked, frequently causing the case to open when it falls. Besides, at the design stage of the case, these hinged fastening means are easier to devise and develop than screw-fastening systems since these parts to be developed are made of plastic whereas the screws, which are commercially distributed elements, are more difficult to modify.

According to one particular embodiment, the means of hinged fastening are implemented by a rotation shaft passing through the lower cover in its width and having two ends at which the upper cover is fixed.

Thus, according to this particular embodiment of the invention, the upper cover of the case gets fixed to the lower cover at the two ends of a rotation shaft passing through the lower cover along its width, then enabling the lower cover to pivot about this rotation shaft relative to the upper cover (and vice versa).

In this way, the two covers remain fixedly joined to each other in both the open and the closed positions of the case and in the intermediate positions between opening and closing.

In addition, these fastening means formed by a rotation shaft have a better solidity and fall resistance than the presently used screw-fastening means for example.

In particular, the upper cover gets fixed to the lower cover by deformation of at least one of said covers and orientation of the covers relative to each other at a predetermined angle.

Thus, for example, the upper cover gets fixed to the lower cover by means of the two ends of the rotation shaft by deformation of the upper cover thus enabling the two covers to be kept fixedly joined without any need for other means. Indeed, the upper cover can be "clipped" on to the lower cover by "forcing" the insertion of the lower cover so that the upper cover remains fixed when it resumes its normal shape.

In this way, no tool is needed to fit in the upper cover to the lower cover.

Besides, not only does the upper cover get deformed during the fastening but the lower cover is tilted so as to get inserted firstly into one end of the rotation shaft and then into the other end. Thus, the two covers cannot be easily detached from each other cannot and this reinforces its fall resistance.

According to one particular characteristic of the invention, at least one of the ends of the rotation shaft has means for locking the upper cover to the lower cover.

Thus, according to this particular embodiment of the invention, once the upper cover is clipped onto the lower cover, by deformation, locking means enable additional security of fastening of the two covers in the closed position.

In this way, it is not enough to deform the upper cover again in the other direction in order to detach the lower cover but it is first of all necessary to actuate the locking means in opening the case.

This embodiment therefore also reinforces fall resistance.

According to one particular aspect of the invention, the locking means are to cooperate with blocking means on the upper cover to take at least one position of locking of the covers to each other and one position of unlocking the covers from each other.

Thus, according to this particular embodiment of the invention, the locking means situated at the end of the rotation shaft on the lower cover are associated with blocking means situated on the upper cover making it possible, once the upper cover is "clipped" on to the lower cover, to lock the fastening of the two covers to each other, for example by closing the case.

For unlocking, it is then enough to open the case.

In this way, the covers can be locked to each other by a simple gesture without any additional tool. Besides, this locking further optimizes the fall resistance of such a terminal case.

For example, the locking means consist of a lock with at least one interior recess and the blocking means consist of a cavity having at least one protrusion intended for insertion into the recess of the lock in order to block it.

Thus, according to this particular embodiment of the invention, the locking means consist of a lock at the end of the rotation shaft on the lower cover which makes for example a quarter turn when the case is closed, the lock getting blocked in the blocking means provided on the upper cover, at the fastening to the lower cover.

For example, these blocking means consist of a hollow or a hole at the two parts of the upper cover that get fastened to the lower cover, this hollow/hole having one or two protrusions within it that get inserted into one or more recesses provided within the lock, thus providing for the blocking or the locking of the hinged fastening means.

According to one particular characteristic of the invention, the locking means have a means for attaching a cord.

Thus, according to this particular embodiment of the invention, the locking means are also used to put through a cord, such as a strap for example, for a mobile use of the terminal.

In this way, two functions (locking of the fastening of the two covers of the case and the passing through of a cord) are fulfilled by the same means, thus optimizing the manufacture of the case of the terminal and its compactness.

According to one particular embodiment of the invention, the rotation shaft is situated at one end of the lower cover that has a housing for a roll of paper.

Thus, according to this particular embodiment of the invention, the rotation shaft serving to fasten the two covers is situated in a space planned to house the roll of paper so as to minimize the space needed for this fastening system according to the invention. Indeed, the size of the housing provided for the roll of paper can be slightly increased to receive the rotation shaft without any appreciable modification of the ergonomy of the terminal.

In addition, this position on the terminal is skillfully chosen to make the two covers pivot relative to each other because this position is at one end of the terminal and therefore enables an optimal opening position of the cover for any maintenance operation for example.

Finally, at present, on certain terminals it is at this position (at the housing for the paper roll, on either one of the sides of the case) that means are planned for attaching a cord, such as a strap for example that can be kept according to this embodiment of the invention as described here above.

The invention also pertains to a terminal comprising a case as described here above.

5. LIST OF FIGURES

Other features and advantages of the invention shall appear more clearly from the following description of a particular embodiment, given by way of a simple illustratory and non-exhaustive example and from the appended drawings, of which:

Figure 4A:
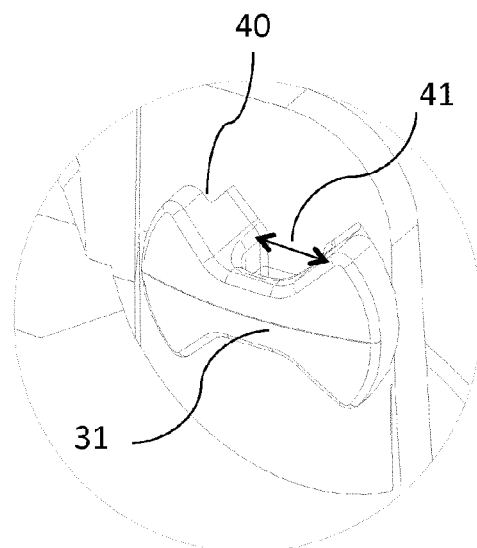
Figure 4B:
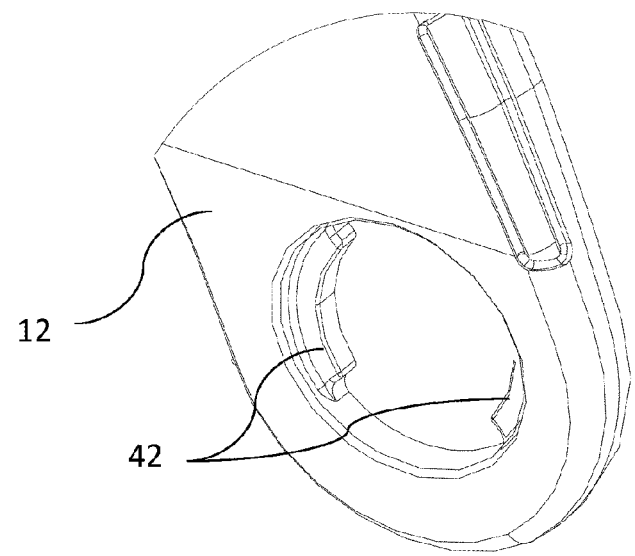
Figure 4C:
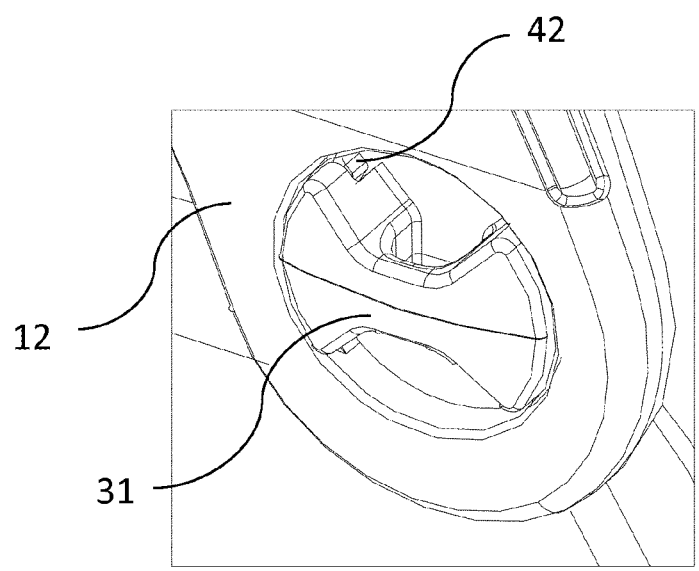

FIGS. 4a to 4c present an example of means of locking and means of blocking means of hinged fastening according to one particular embodiment of the invention.

6. DESCRIPTION OF ONE EMBODIMENT OF THE INVENTION

6.1 General Principle

The general principle of the invention relies on the use of means of hinged fastening to fasten the two parts (lower cover and upper cover) of a terminal case, in such a way as to reinforce the fall resistance of the case while complying with the constraints of limited terminal size.

Thus, the use of such means of hinged fastening does away with the need to use additional screws to ensure efficient closure of the case while ensuring optimal fall resistance of the terminal.

These means of hinged fastening also make it possible to keep the lower and upper covers fixedly joined together even in the open position, thus making for easier maintenance of the terminal. In particular, since the two covers remain fixedly joined, the identification label, usually glued to the lower cover, itself also remains attached to the upper cover.

6.2 Description of One Embodiment

Figure 1:
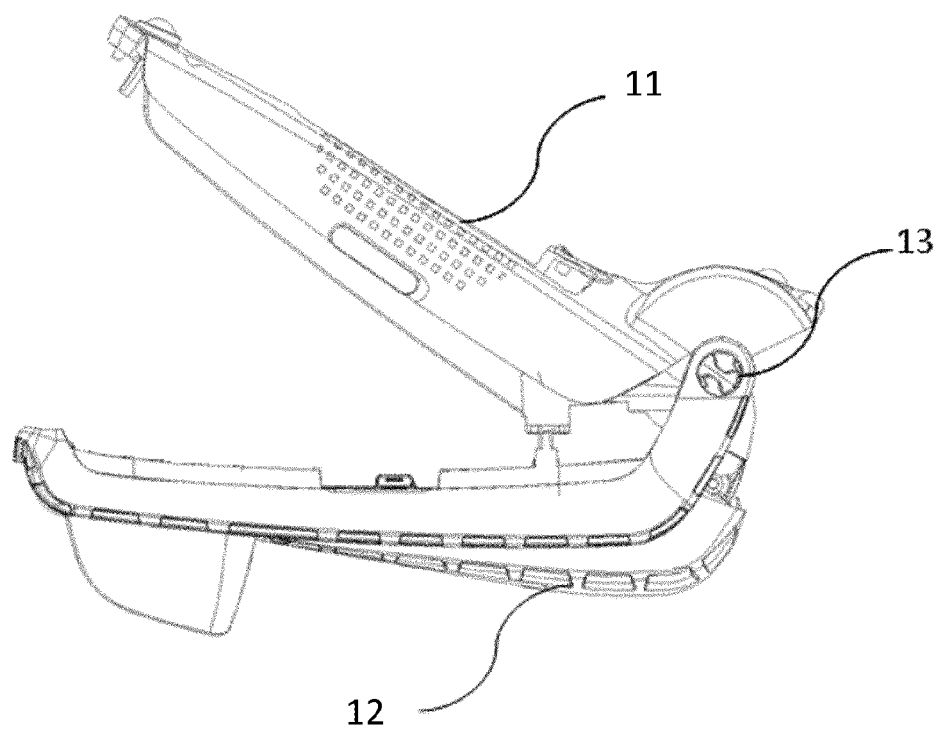
FIG. 1 shows a side view of a case of a terminal according to one particular embodiment of the invention.
Figure 2:
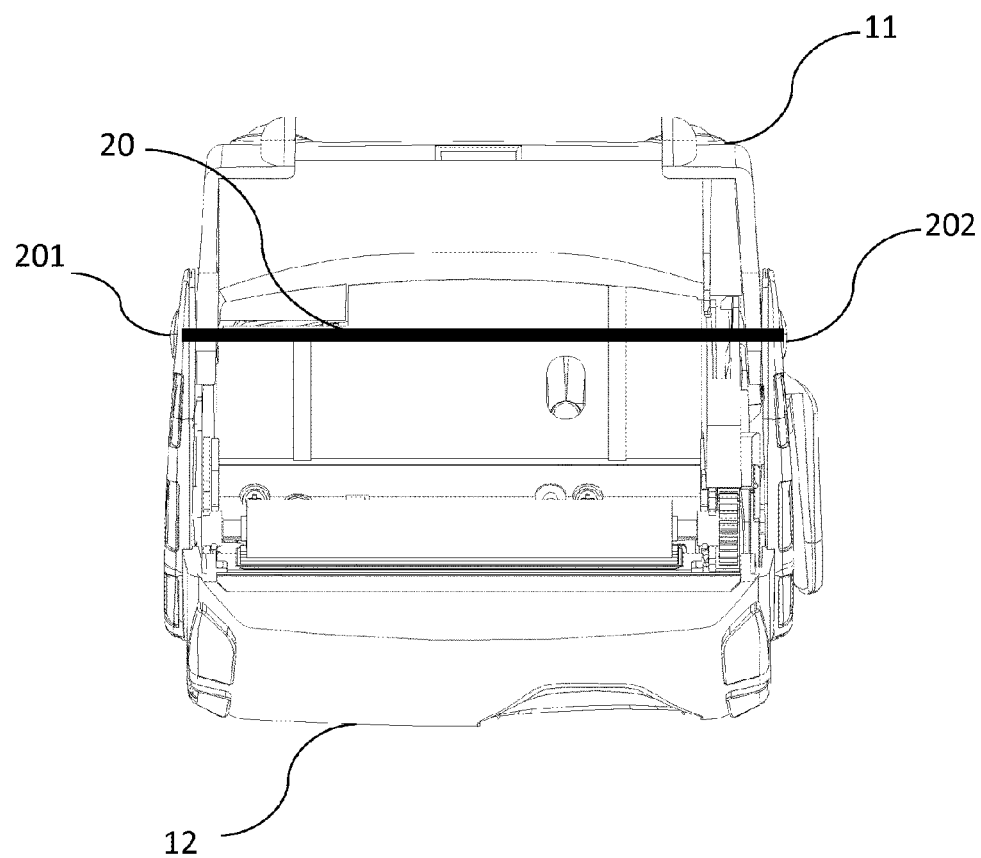
FIG. 2 shows a rear view of a case of a terminal according to one particular embodiment of the invention.
Figure 3:
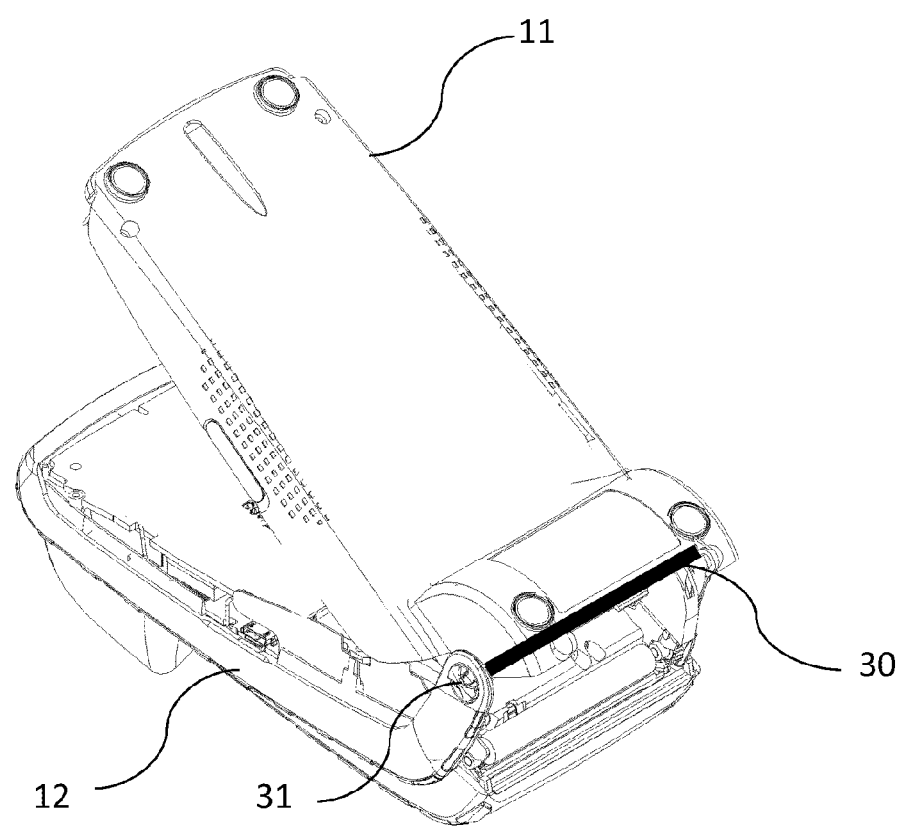
FIG. 3 shows a top view of a case of a terminal according to one particular embodiment of the invention.

According to one particular embodiment of the invention, illustrated especially in FIGS. 1 to 3, the case of the terminal is formed by two parts 11 and 12 respectively denoted as the lower and upper covers fastened to each other by hinged fastening means (hinged fastener) 13, partially illustrated in FIG. 1.

In particular, according to this particular embodiment of the invention, the hinged fastener 13 is constituted by a rotation shaft (20, 30) (illustrated in FIGS. 2 and 3) integrated into the lower cover 11, for example at the housing for the paper roll. In different variants of this embodiment, this rotation shaft can be placed at other positions of the lower cover, depending for example on the layout of the components inside the terminal.

This rotation shaft passes through the lower cover 11 in its width and its two ends 201 and 202 correspond to the fastening points of the upper cover 12.

Thus, once fastened to each other, the two covers are fixedly joined and mobile relative to each other along the rotation shaft (20, 30).

In this way, when the terminal case needs to be opened for purposes of maintenance, the upper cover can remain fixed to the lower cover 11 while enabling access to the internal components/elements of the terminal.

In addition, the hinged fastener 13 is distinguished from the use of screws by their higher resistance to the falling of the terminal, due especially to the intrinsic elasticity of the fastener, unlike in the example of screw-fastening sleeves which can break during a fall.

Finally, the hinged fastener 13 has little impact on the size of the case and therefore of the terminal, the rotation shaft being easily integrated into a part of the case that is provided to house the roll of paper and it therefore has no impact on the thickness of the case.

Besides, these means of hinged fastening 13 enable reliable closure of the case firstly because of the very principle of insertion of the lower cover 11 into the upper cover 12 and secondly because of a lock provided on either or both of the ends (201, 202) of the rotation shaft described in detail here below.

Indeed, the very principle of fastening of the two covers provides for a clipping of the upper cover 12 to the lower cover 11 at the ends (201, 202) of the rotation shaft (20, 30) by deformation of the upper cover 12 to insert the lower cover 11.

This insertion is done in two steps, and the lower cover 11 is preferably tilted relative to the upper cover 12 so as to limit the resistance at the time of insertion. Thus, the upper cover 12 is first of all fixed to one end of the rotation shaft of the lower cover and then to the other end in "forcing" the insertion in such a way that when the upper cover 12, once fastened, recovers its initial form, it is placed flat against the lower cover 11 thus providing for solid fastening.

It must be noted that these means of hinged fastening 13 do not require any tool or additional equipment to fasten the covers to each other, unlike in the use of screws.

In addition, as indicated here above, this particular embodiment of the invention provides for a lock 31 (illustrated especially in FIGS. 3, 4a to 4c) on either or both of the ends of the rotation shaft associated with blocking element 42 (FIG. 4b) on the upper cover 12 firstly enabling the case to be kept closed and secondly preventing a withdrawal of the lower cover by simple reverse deformation when the case is closed.

For example, the lock 31 consists of a sort of lock that makes a quarter turn when the case is closed, once the two covers are fixed to each other, and gets blocked by the blocking element 42 provided on the upper cover 12, at the position of its fastening to the lower cover 11.

For example, as illustrated in FIG. 4a, the lock 31 comprises one or more recesses 40 intended to cooperate, when the case is closed, with blocking element 42 provided on the upper cover 12.

For example, as illustrated in FIG. 4b, the blocking element 42 consists of two protrusions, within a hole provided at the fastening of the upper cover 12 to the cover 11 intended for insertion into the recesses 40 of the lock 31.

FIG. 4c illustrates this situation of blocking of the hinged fastener 13, according to this embodiment of the invention, by cooperation of the lock 31 with the blocking element 42.

In this way, when there is a fall especially, the case is kept closed.

It must be noted here again that this cooperation of the lock with the blocking element does not require any tool or additional equipment to lock the fastening of the covers to each another.

Advantageously, according to one variant of this embodiment illustrated in FIG. 4a, the lock also provides the function of attaching a cord, for example for a mobile use of the terminal. Indeed, it is possible to be able to secure the mobility of the terminal by a cord, or a strap, passed around the wrist (or neck where there is attachment to both sides) and prevent the terminal from falling when the user involuntarily lets go of it. This known function in certain existing terminals is herein advantageously integrated into the lock provided on either or both the ends of the rotation shaft of the means for fastening the covers of the case.

Thus, the lock 31 comprises a passage 41 for the insertion of a strap.

To reinforce the solidity of this passage 41 during the mobile use of the terminal, several recesses 40 are provided, enabling the stresses on the parts to be distributed and thus preventing deformation or even a breakage of parts.

At least one embodiment of the present disclosure overcomes the different drawbacks of the prior art.

At least one embodiment provides a technique that can be used to take account of the size constraints of a terminal while at the same time providing a terminal case that offers optimal fall resistance.

Although the present disclosure has been described with reference to one or more examples, workers skilled in the art will recognize that changes may be made in form and detail without departing from the scope of the disclosure and/or the appended claims.

The invention claimed is:

1. A case for a terminal, comprising:
   at least one lower cover and one upper cover; and
   a hinged fastener joining said lower cover and upper cover to each other, said hinged fastener being adapted to taking at least one position of closure of the case and one position of opening of the case, in which said lower cover and upper cover are fixedly attached, wherein the hinged fastener is implemented by a rotation shaft passing through said lower cover in its width and having two ends at which said upper cover is fixed,
   wherein at least one of said ends of said rotation shaft have a lock for locking said upper cover to said lower cover, and said lock is adapted to cooperate with a blocking element on said upper cover to take at least one position for locking said covers to each other and a position for unlocking said covers from each other.

2. The case according to claim 1, wherein said upper cover gets fixed to said lower cover by deformation of at least one of said covers and orientation of said covers relative to each other at a predetermined angle.

3. The case according to claim 1, wherein said lock includes at least one interior recess and said blocking element includes a cavity having at least one protrusion adapted to getting inserted into said at least one recess of said lock to block it.

4. The case according to claim 1, wherein said lock includes a means for attaching a cord.

5. The case according to claim 1, wherein said rotation shaft is situated at said one end of said lower cover that has a housing for a roll of paper.

6. A terminal comprising:
   a case for a terminal, comprising:
   at least one lower cover and one upper cover; and a hinged fastener joining said lower cover and upper cover to each other, said hinged fastener being adapted to taking at least one position of closure of the case and one position of opening of the case, in which said lower cover and upper cover are fixedly attached, wherein the hinged fastener is implemented by a rotation shaft passing through said lower cover in its width and having two ends at which said upper cover is fixed,
wherein at least one of said ends of said rotation shaft have a lock for locking said upper cover to said lower cover, and said lock is adapted to cooperate with a blocking element on said upper cover to take at least one position for locking said covers to each other and a position for unlocking said covers from each other.

\* \* \* \* \*